Aug. 25, 1964  H. FURMAN  3,146,032
WHEEL COVER
Filed Nov. 30, 1961
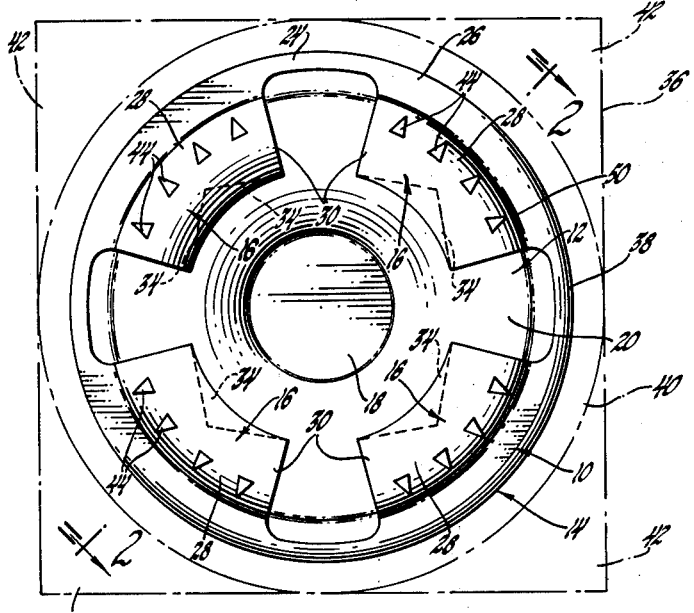
INVENTOR.
Herbert Furman
BY
Herbert Furman
ATTORNEY

United States Patent Office 3,146,032
Patented Aug. 25, 1964

3,146,032
WHEEL COVER
Herbert Furman, Detroit, Mich., assignor to General Motors Corporation, Detroit, Mich., a corporation of Delaware
Filed Nov. 30, 1961, Ser. No. 155,920
1 Claim. (Cl. 301—37)

This invention relates to wheel covers and more particularly to a wheel cover embodying self-retaining means for removably mounting the cover on a vehicle wheel.

It is well known to make wheel covers from polygonally shaped blanks wherein the major portion of the blank is utilized to form the cover body and the cover marginal structure, and the corners of the blank are utilized to form the cover retaining means. By use of such blanks, scrap loss is maintained at a minimum. This is important in the manufacture of wheel covers since they are usually made of high grade stainless steel.

The wheel cover of this invention is intended to be manufactured from a square shaped blank wherein the major portion of the blank is utilized to form the cover body and the cover marginal portion and the corners of the blank are fully utilized, with no scrap loss, to provide four equally spaced cover retaining structures which are generally of looped formation, each including an axially and radially inwardly extending radially outer leg adapted to confront an axially extending intermediate flange of a wheel rim and joined on a large juncture rib with an axially and radially outwardly extending radially inner leg, the terminal portion of which is shaped to conform to and slidably engage an intermediate axially inwardly dished portion of the cover body. Cover retaining means of a suitable type, such as lanced radially outwardly extending teeth, are provided on the radially outer leg for retaining engagement with the intermediate flange of the wheel rim, while the juncture area or rib between the radially outer and inner legs axially confronts the wheel body whereby the legs mutually strengthen each other with the radially outer leg being resiliently backed up and supported by the radially inner leg to resiliently hold the cover retaining means in engagement with the wheel rim flange. In another embodiment of the invention, an annular axially inwardly extending rib is provided in the cover body radially inwardly of the area of engagement of the terminal portions of the radially inner leg to limit radially inward sliding movement of the radially inner legs relative to the cover dished portion.

Thus, this invention provides a wheel cover of the self-retaining type which may be manufactured from the minimum possible blank size with no scrap loss.

The primary object of this invention is to provide a new and improved wheel cover of the self-retaining type adapted to be removably mounted on a vehicle wheel, with the cover being manufactured from a minimum blank size and with substantially all of the material of the blank being utilized to form the cover body and cover self-retaining means.

This and other objects of the invention will be readily apparent from the following specification and drawings wherein:

FIGURE 1 is a rear elevational view of a wheel cover according to one embodiment of the invention, with the cover being superimposed on the original blank from which the cover is made;

FIGURE 2 is a sectional view taken generally along the plane indicated by line 2—2 of FIGURE 1;

FIGURE 3 is a partial rear perspective view;

FIGURE 4 is a view similar to FIGURE 2 showing another embodiment of this invention; and FIGURE 5 is a partial rear perspective view of the cover of FIGURE 4.

Referring now to FIGURES 1 through 3 of the drawings, the wheel cover 10 generally includes a cover body 12, a cover marginal portion 14, and cover retaining structures 16 located rearwardly of the cover body and being equally spaced circumferentially thereof.

The cover body 12 generally includes a central crown portion 18, the radially outer wall of which merges into and forms a portion of an intermediate axially inwardly dished portion 20 of the cover body. The dished portion 20 merges into the cover marginal portion 14 which generally includes an axially outer radially extending annular flange portion 22 and an axially inner radially extending flange portion 24 joined on a juncture rib 26 to the portion 22.

The cover retaining structures 16 each extend from the flange portion 24 and are generally of loop formation, including an axially inwardly and radially inwardly extending radially outer leg 28 joined on a large juncture rib or portion 30 with an axially outwardly extending radially inner leg 32. The legs 32 terminate in terminal or flange portions 34 which are shaped to conform to and slidably engage the inner surface of the axially inwardly dished portion 20 of the cover body generally adjacent the base thereof as shown.

Referring now particularly to FIGURE 1, the cover body 12 including the crown portion 18, the dished portion 20 and the flange portion 22 are derived from the major portion of the material of a cover blank 36 indicated by dot-dash lines. The circular portion of the blank defined by the line 38 is utilized to form the aforesaid cover portions, while the annular portion of the blank between the lines 38 and 40 is utilized to provide the flange portion 24 and rib 26 of the cover, and the corner portions 42 of the blank are utilized to provide the cover retaining structures 16. While the method of manufacture of the cover is not shown or disclosed herein, the cover may be very easily manufactured by the method shown in the copending application of Thomas B. Frame et al., S.N. 27,107, filed May 5, 1960, and assigned to the assignee of this invention.

A comparison of the cover 10 and the blank 36 indicates that the cover utilizes all of the material of the blank so that there is no scrap loss and the cover blank size is kept to an absolute minimum. This is important in the manufacture of wheel covers, since they are made from high grade stainless steel, such as 301 or 430 stainless steel.

Since the cover retaining structures 16 are derived from the generally triangularly shaped portions 40 of the cover blank, the legs 28 and 32 of these stuctures flare oppositely to each other and are joined at their respective portions of narrowest and widest divergence by the juncture ribs or portions 30. The side edges of the legs 28 converge axially inwardly relative to the cover body while the side edges of the legs 32 converge axially outwardly relative to the cover body, with the legs 32 being joined to the legs 28 at the portions of widest divergence of the former and narrowest convergence of the latter. The terminal portions 34 of the legs 32 are generally triangularly shaped, flaring relating to the legs 32 and each is shaped to conform to the dished cover body portion 20 so as to slidably bear thereagainst. Thus, the flange portions 34 are arcuately shaped both circumferentially and radially of the cover body.

In order to self-retain the cover on a vehicle wheel, a plurality of lanced radially outwardly extending fingers 44 are provided in the legs 28. The fingers 44 are adapted to grip and bite into the axially extending intermediate flange of the vehicle wheel in order to self-retainingly mount the cover 10 on the wheel, with the flange portion 24 engaging the radially extending terminal flange of the wheel rim, and the juncture areas or ribs 30 confronting the wheel body adjacent the juncture of the wheel body with the wheel rim. Although a particular type of cover retaining finger is shown, it is believed obvious that other types of cover retainer structures may be used, such as circumferentially extending ribs provided in the legs 28, and radially outwardly extending fingers which have their side edges joined to the material of the legs 28.

FIGURES 4 and 5 show another embodiment of this invention which is similar to the embodiment shown in FIGURES 1 through 3, and accordingly, like numerals have been used for like parts. This embodiment of the invention differs from the first embodiment in that it includes a radially inwardly extending axially outwardly opening continuous annular rib 46 provided in the dished cover body portion 20 immediately adjacent the legs 32 to limit inward sliding movement of the terminal portions or flanges 34 of the legs relative to the cover body portion 20.

In both embodiments of the invention, when the cover is mounted on the wheel, the engagement of the cover retaining fingers 44 with the intermediate flange of the wheel rim tends to radially swing the legs 28 inwardly of the cover body about the juncture ribs 50 of these legs with the flange portion 24. In the first embodiment of the invention, this movement of the legs 28 is limited by the legs 32, which will be placed in compression, and the sliding movement of the terminal portions 34 relative to the cover body 20. In the second embodiment of the invention, such movement of the legs 28 is limited by the sliding engagement of the portions 34 with the cover body and the engagement of the legs 32 with the rib 46.

Thus, this invention provides a new and improved wheel cover embodying novel self-retaining means for mounting the cover on a vehicle wheel, with the cover being made from a blank of the minimum possible size.

What is claimed is:

A wheel cover comprising, a circular cover body derived from an originally polygonally shaped blank and including a cover margin having projecting therefrom a plurality of spaced axially outwardly opening loop-like cover retaining structures derived from the corners of said blank, said retaining structures each including an axially inwardly extending leg adapted to radially confront an axially extending radially facing surface of a vehicle wheel and being joined by an arcuate juncture portion to an axially outwardly extending leg disposed substantially perpendicular to said cover body and having a terminal portion extending radially and substantially perpendicularly outwardly therefrom across a juncture portion, said legs flaring oppositely with respect to each other from their proximal portions adjacent said arcuate juncture area with said axially inwardly extending leg having its area of greatest divergence adjacent the distal end thereof and said axially outwardly extending leg having its area of narrowest divergence adjacent the distal end thereof, said axially outwardly extending legs radially confronting each other across the central portion of said cover body, said terminal portions being shaped to conform radially and circumferentially to the shape of the inner surface of said cover body central portion and radially slidably engaging therewith, cover retaining means formed from the material of said axially inwardly extending legs and located intermediate said cover margin and said arcuate juncture portion for engagement with said radially facing wheel surface to retain said cover on said wheel, engagement of said retaining means with said wheel surface causing said retaining structures to open radially of said cover and to radially move said terminal portions along the inner surface of said cover body central portion, and axially extending rib means engageable with said juncture portion between said axially outwardly extending legs and said terminal portions to limit radial movement of said terminal portions with respect to said cover body.

References Cited in the file of this patent
UNITED STATES PATENTS

| | | |
|---|---|---|
| 2,368,228 | Lyon | Jan. 30, 1945 |
| 2,624,640 | Lyon | Jan. 6, 1953 |
| 2,772,924 | Landell | Dec. 4, 1956 |
| 2,805,893 | Lyon | Sept. 10, 1957 |
| 2,864,654 | Hurd | Dec. 16, 1958 |
| 2,918,329 | Wood | Dec. 22, 1959 |
| 2,947,573 | Lyon | Aug. 2, 1960 |
| 3,006,691 | Lyon | Oct. 31, 1961 |